US009527457B2

(12) United States Patent
Gasparro

(10) Patent No.: US 9,527,457 B2
(45) Date of Patent: Dec. 27, 2016

(54) SPORT BOARD WITH CAMERA MOUNT

(71) Applicant: Gianfranco Gasparro, Hermosa Beach, CA (US)

(72) Inventor: Gianfranco Gasparro, Hermosa Beach, CA (US)

(73) Assignee: Gianfranco Gasparro, Hermosa Beach, CA (US)

( * ) Notice: Subject to any disclaimer, the term of this patent is extended or adjusted under 35 U.S.C. 154(b) by 0 days.

(21) Appl. No.: 15/210,616

(22) Filed: Jul. 14, 2016

(65) Prior Publication Data

US 2016/0318459 A1 Nov. 3, 2016

Related U.S. Application Data

(63) Continuation-in-part of application No. 14/612,513, filed on Feb. 3, 2015.

(51) Int. Cl.
A63C 5/03 (2006.01)
B60R 11/04 (2006.01)
B63B 35/85 (2006.01)
B63B 35/79 (2006.01)
A63C 17/00 (2006.01)
G03B 17/56 (2006.01)
G03B 29/00 (2006.01)

(52) U.S. Cl.
CPC ........... B60R 11/04 (2013.01); A63C 17/0006 (2013.01); B63B 35/7926 (2013.01); B63B 35/85 (2013.01); G03B 17/561 (2013.01); G03B 29/00 (2013.01)

(58) Field of Classification Search
CPC .... B63B 35/7926; B63B 35/85; B60F 3/0007; B60R 11/04; A63C 17/0006; G03B 17/561; G03B 29/00
See application file for complete search history.

(56) References Cited

U.S. PATENT DOCUMENTS

| 7,985,111 | B2 * | 7/2011 | Gasparro | B29C 44/569 441/74 |
| 9,268,201 | B1 * | 2/2016 | Montgomery | G03B 17/561 |
| 2007/0205241 | A1 * | 9/2007 | Mourao | F16M 13/00 224/401 |
| 2010/0061711 | A1 * | 3/2010 | Woodman | B63B 25/002 396/428 |

* cited by examiner

Primary Examiner — Stephen Avila
(74) Attorney, Agent, or Firm — Thomas Schneck

(57) ABSTRACT

A sport board with a forward outboard extension for supporting an action camera. The extension member has a curved section between generally straight sections that places the action camera forward and slightly above the surface of the board. The extension member may be a unitary member mounted on either surface of the board, or a two-piece member, with one piece mounted on the upper surface and another piece mounted on a lower surface.
When the sport board is a surfboard, the construction of the extension member resembles a fin.

13 Claims, 5 Drawing Sheets

SPORT BOARD WITH CAMERA MOUNT

CROSS-REFERENCE TO RELATED APPLICATION

This application is a continuation-in-part of prior application Ser. No. 14/612,513, filed Feb. 3, 2015 for Surfboard with a Camera Mount by Gianfranco Gasparro which claims priority from provisional application Ser. No. 61/935,112, filed Feb. 3, 2014.

TECHNICAL FIELD

The invention relates to sport boards, and in particular to a forward extension for a sport board that can be used to support a camera.

BACKGROUND ART

Published application 2015/0217839 describes a hook-like fin for mounting an action camera forward of a surfboard or the like. The device projects forwardly from a mounting location near the nose of the board to a location in front of the most forward portion of the board. The fin and ancillary members support the action camera.

The mount for the hook-like fin may be located on the underside of the board using a box with a slot to receive a flattened end portion of a fin, or merely have slots or plugs of the type known in the art for mounting after market fins. For example, one type of mount is similar to the FCS, for Fin Control System, that consists of two tab slots, each in a plug, that can secure fin tabs with a screw to hold projecting tabs of a fin in place. The genuine FCS system is described at the website www.surffcs.com where a titanium rod in a polymer barrel in a holder inserted into the bottom side of a board is used to apply holding force to a fin.

Alternative tab holders are simpler and known in the art for mounting the fin extension to the board. The hook-like fin projects forwardly from under the board to a location forward of the nose where an adjustable strut projects forwardly even further. The strut may extend upwardly at a selected angle but not necessarily. At the forward end of the strut, an upwardly extending camera base is mounted, with an action camera at the top of the base at a position to photograph a surfboard user's feet, legs, and body.

While the device of the prior art has been used successfully, the upwardly extending strut and camera base sometimes needs adjustment, particularly when boards are used in heavy surf. An object of the invention was to improve the prior fin extension device with an extension member that does not require adjustments except at the camera location.

SUMMARY DISCLOSURE

The above object has been met by a combination sport board with a forward outboard extension serving as a support for an action camera that is either unitary or, at least, has no adjustable forward strut. The camera is supported forward and slightly above the surface of the board, not on the board itself. The sport board may be a surfboard, a boogie board, a wake board, a paddle board, a water ski, or other type of water board, a skateboard, a kick scooter or other type of land board. In each case an elongated sport board has spaced apart parallel upper and lower surfaces wherein the upper surface has width and length dimensions accommodating a person's feet. The board has a central lengthwise axis having a forward end with a nose region, frequently rounded immediately behind the forward end of the board and a rearward end opposite to the forward end.

In order to support an action camera, an extension member is connected to the board. The extension member, which may be a fin, has opposed first and second ends, with a curved region spaced therebetween, usually concave upwardly to gain a desired angle for the second end. A first end of the extension member is connected to an end region of the sport board, preferably the nose region but alternating the tail region. The extension member has a first straight section aligned with the board linear axis followed by a curved upwardly concave section, followed by a second straight section angled upwardly, typically at an angle of at least 20 degrees. The first and second straight sections are on opposite ends of the curved middle section. The second straight section terminates at a forward location away from the sport board supporting a forward platform capable of mounting an action camera. The extension member may be mounted on either side of the board, but the lower surface is preferred for non-interference with a user's feet.

An action camera mounted on the platform has a field of view of the entire board and the entire person on the sport board that can take video pictures of the person moving on the board.

In the situation where the sport board is a surfboard, the outboard extension preferably has the thickness of a fin so that a minimum amount of forward resistance affects the board. A fin slices through water with low forward resistance, although its vertical profile may admit some lateral torque which is undesirable. Holes in the extension member may be provided to reduce lateral torque where the extension member is used in water. In the situation where the board is a boogie board or the like, a much wider and thinner extension member may be selected.

In the situation where the sport board is a skate board, the extension member may be made of two pieces, including a first piece on the top surface of the board and a second piece on the under surface of the board, with fasteners extending from one piece to the other through the thickness of the board in order to retain both pieces in place. The second piece attached on the under surface extends forwardly with an upwardly concave arc to a straight section that is the most forward portion of the device, terminating with a small platform for mounting an action camera.

DETAILED DESCRIPTION

Figure 1:
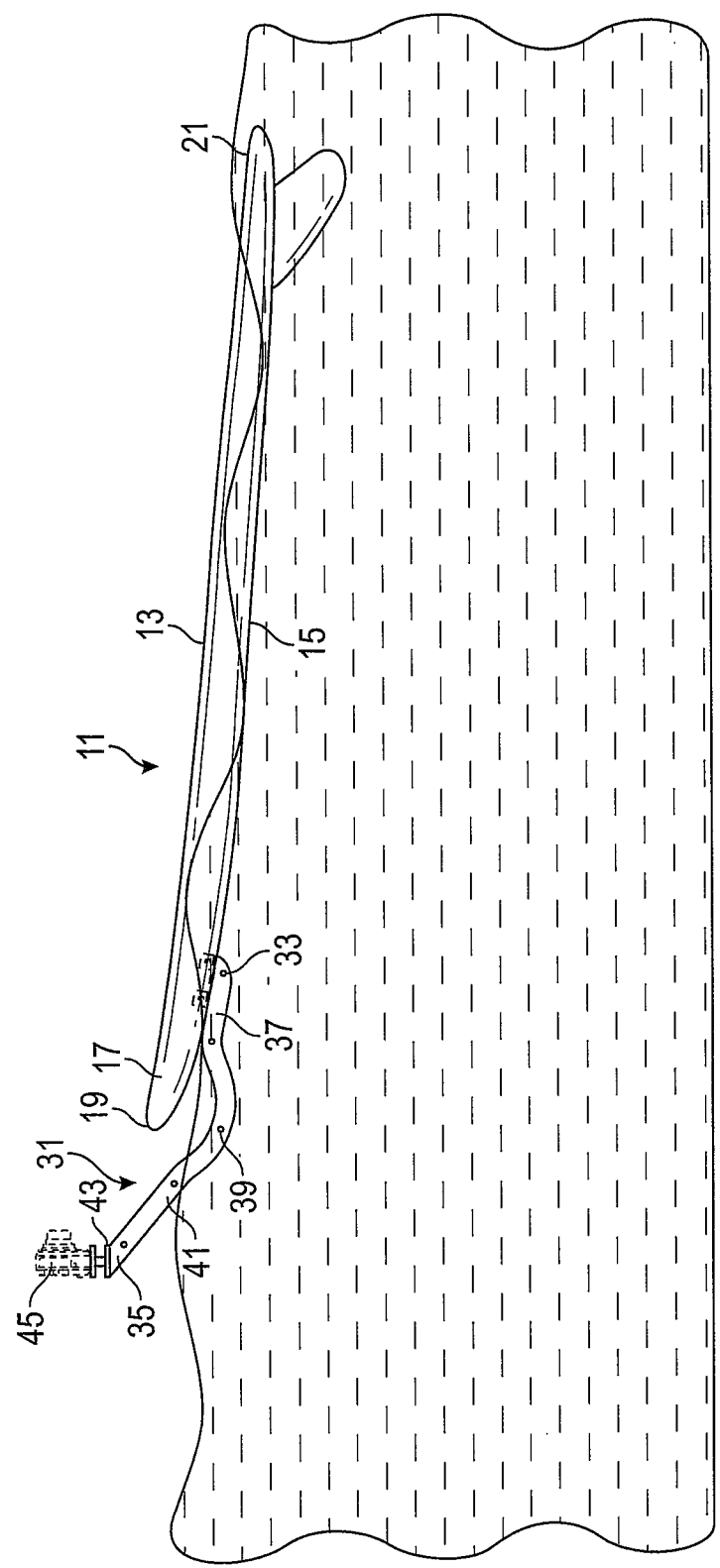
FIG. 1 is a side view of a surfboard having an extension member serving as a support for an action camera in accordance with the invention.

With reference to FIG. 1, a sport board 11 is shown floating in water. The board has an upper surface 13 intended to support a user. A lower surface 15 is directly below upper surface 13 and spaced apart by a floatation material, such as foam. The board has a rounded nose 17, although the shape of the nose cannot be seen in FIG. 1. The rounded nose 17 may curve slightly upwardly from the lower surface of the board or may be flat. The board has a forward end 19 which usually remains out of the water and a rearward end 21 which is frequently submerged. The details of floatation are not significant herein.

The present invention features extension member 31 connected to the rounded nose portion 17 of board 11. The construction of the extension member resembles a fin. The extension member has a first end 33 which is connected to the board by any fasteners suitable for securing fins to a surfboard. The extension member has a distal second end 35 supporting a forward platform 43 which, in turn, supports action camera 45. The first end of the extension member is associated with a first generally straight section 37 of the extension member which includes the means for securing the extension member to the board.

The securing means may be any prior art technique for securing a fin to a surfboard. From the first generally straight section 37 the extension member has a curved portion 39 which is upwardly concave. This means that the extension member dips downwardly slightly before rising in a U-shape, where upward arms of the U-shape have been pulled apart. The curved section 39 is followed by a second generally straight section 41 which angles upwardly. The angle of elevation is in the range of 20 degrees to about 65 degrees relative to the first straight section. As mentioned above, the end of the second straight section 41 terminates with the forward platform 43 supporting action camera 45. Each of the straight sections may deviate slightly from linearity but are generally straight or gently curved by a slight amount.

Figure 2:
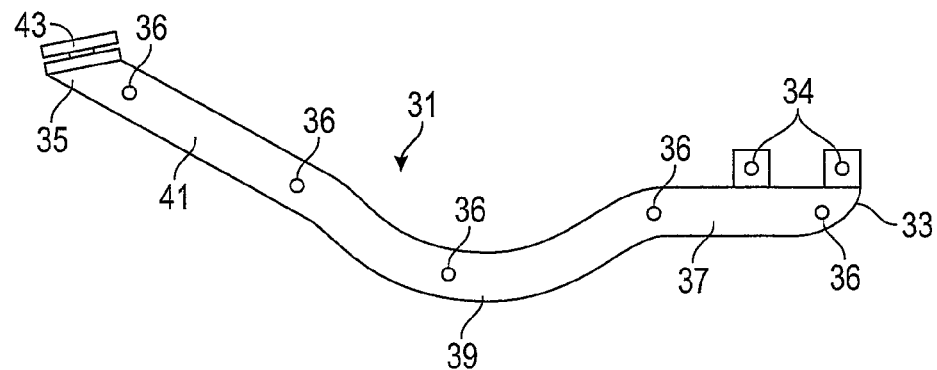
FIG. 2 is a side view of an extension member used with the surfboard shown in FIG. 1.
Figure 3:
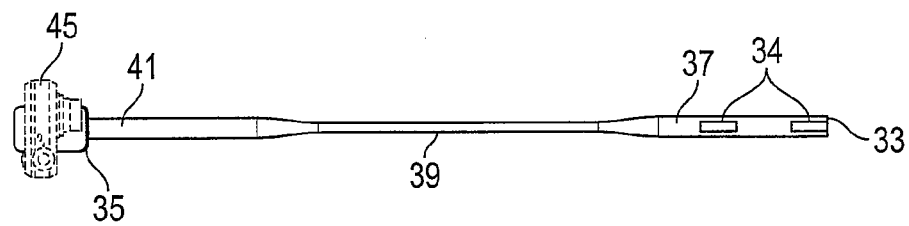
FIG. 3 is a top view of the apparatus of FIG. 2 with an action camera shown in dashed lines.
Figure 4:
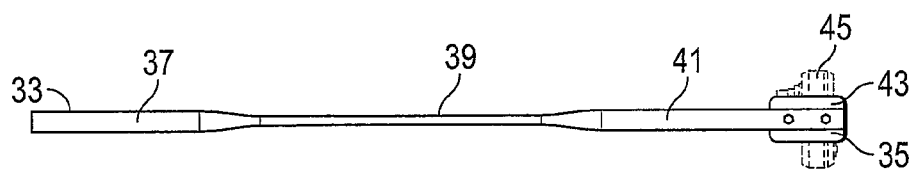
FIG. 4 is a bottom view of the apparatus of FIG. 3 flipped left-to-right.

In FIGS. 2-4 the extension member 31 may be seen in more detail. The first straight section 37 has tabs 34 that may fit into corresponding box holders in surfboard that are part of a fin control system mounting mechanism. Other mounts may be used. The curved middle section 39 is seen to be somewhat thinner than the straight sections. The extension member resembles a fin that may be made of epoxy or a strong plastic material, or fiberglass. The first and second straight sections, 37 and 41 respectively, are seen to sandwich the curved section 39 with all sections formed as a unitary molder, such as by molding or otherwise forming one-piece members. Holes 36 in the extension member, i.e., a perforated extension member, allow water to flow laterally through the extension member when used in water. This reduces lateral torque on the extension member.

Figure 5:
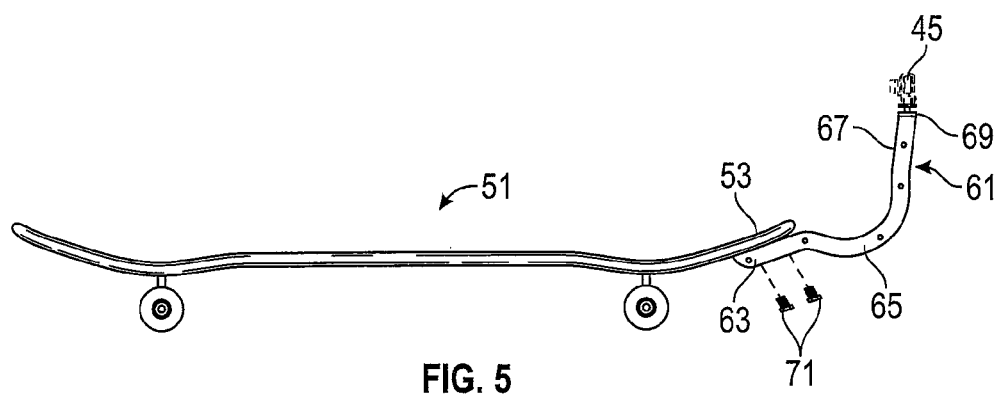
FIG. 5 is a side view of a skateboard having an extension member serving as a support for an action camera in accordance with the invention.
Figure 6:
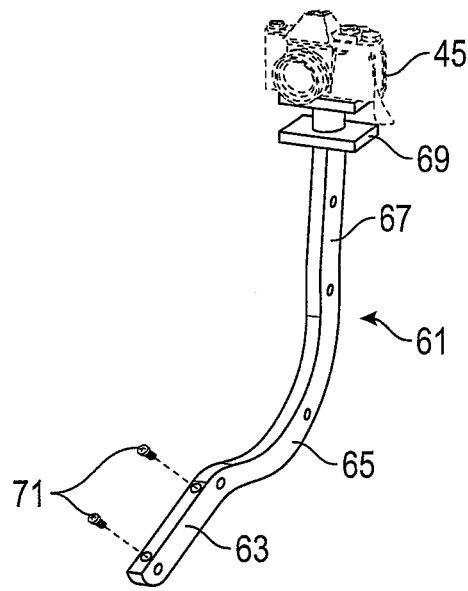
FIG. 6 is a perspective view of a first embodiment of an extension member of the invention for use with a skateboard.
Figure 7:
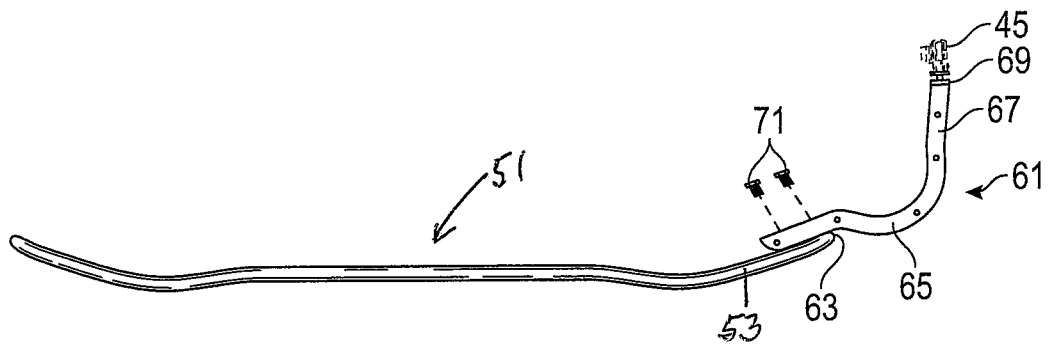
FIG. 7 is a side view of a second embodiment of an extension member of the invention shown attached to a skateboard.

With reference to FIGS. 5-7, a skateboard 51 is seen having a forward end 53 to which the extension member 61 is connected. A first straight section 63 is connected to the forward end 53 by means of fasteners 71.

The curved section 65 follows the first rate section and leads to a second straight section 67. A forward platform 69 is on top of the second straight section. A forward platform 69 and an action camera 41 are atop the second straight section 67.

Figure 8:
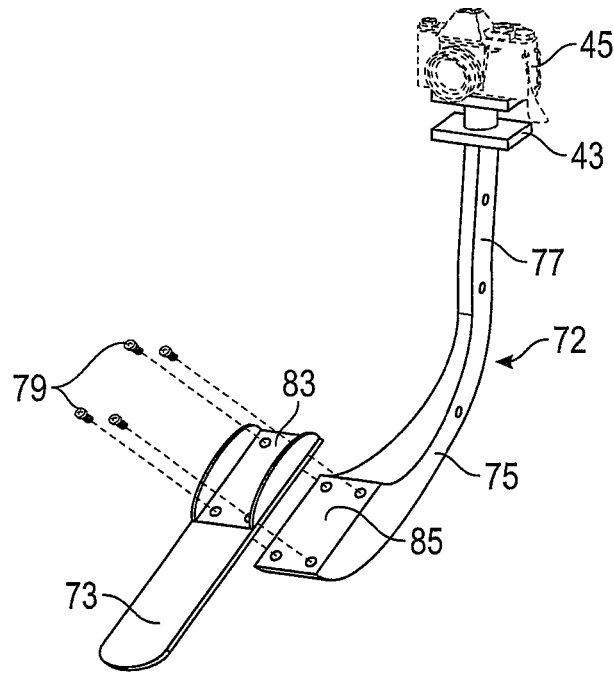
FIG. 8 is a perspective view of a two-piece extension member of the invention.

With reference to FIG. 8, the extension member 72 is seen to be made of two members connected together. The extension member 72 features a first straight section 73 which is fastened to a sport board using a support plate 83 through which fasteners 79 are passed. The first plate provides support for the fasteners. The first straight section 73 is connected to the support board by other fasteners or adhesive, not shown. The upwardly curved section 75 of extension member 72 is mounted on the underside of the support board as a second and distinct piece from the first straight section 73. A second plate 85 secures the curved section 65 to the sport board with the fasteners 79 that reach threads in the second plate 85. The upwardly curved middle section 75 is connected to the second straight section 77 which angles upwardly to support a forward platform 43 and action camera 45.

Figure 9:
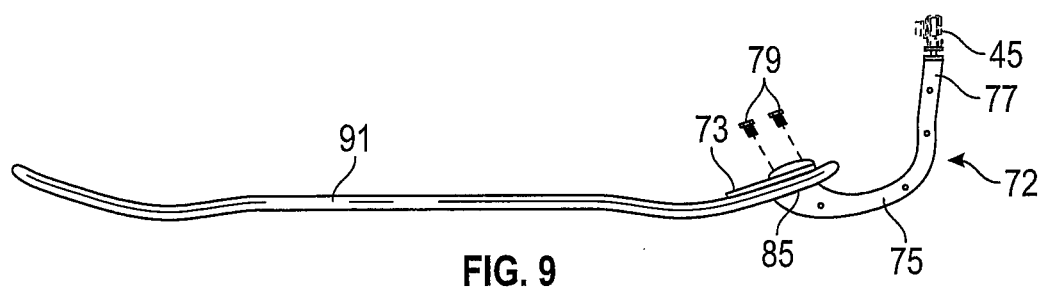
FIG. 9 is a side view of the two-piece extension member of FIG. 8 mounted on a skateboard.

The components of FIG. 8 may be seen in FIG. 9, mounted to sport board 91 which is a skateboard. The first straight section 73 is seen to be above the skateboard 91, while the second straight upwardly curved section 77 and the middle curved section 75 are seen to be mounted to the lower side of the board. The shape of the extension member must be such to allow adequate ground clearance for skateboard wheels, not shown.

Figure 10:
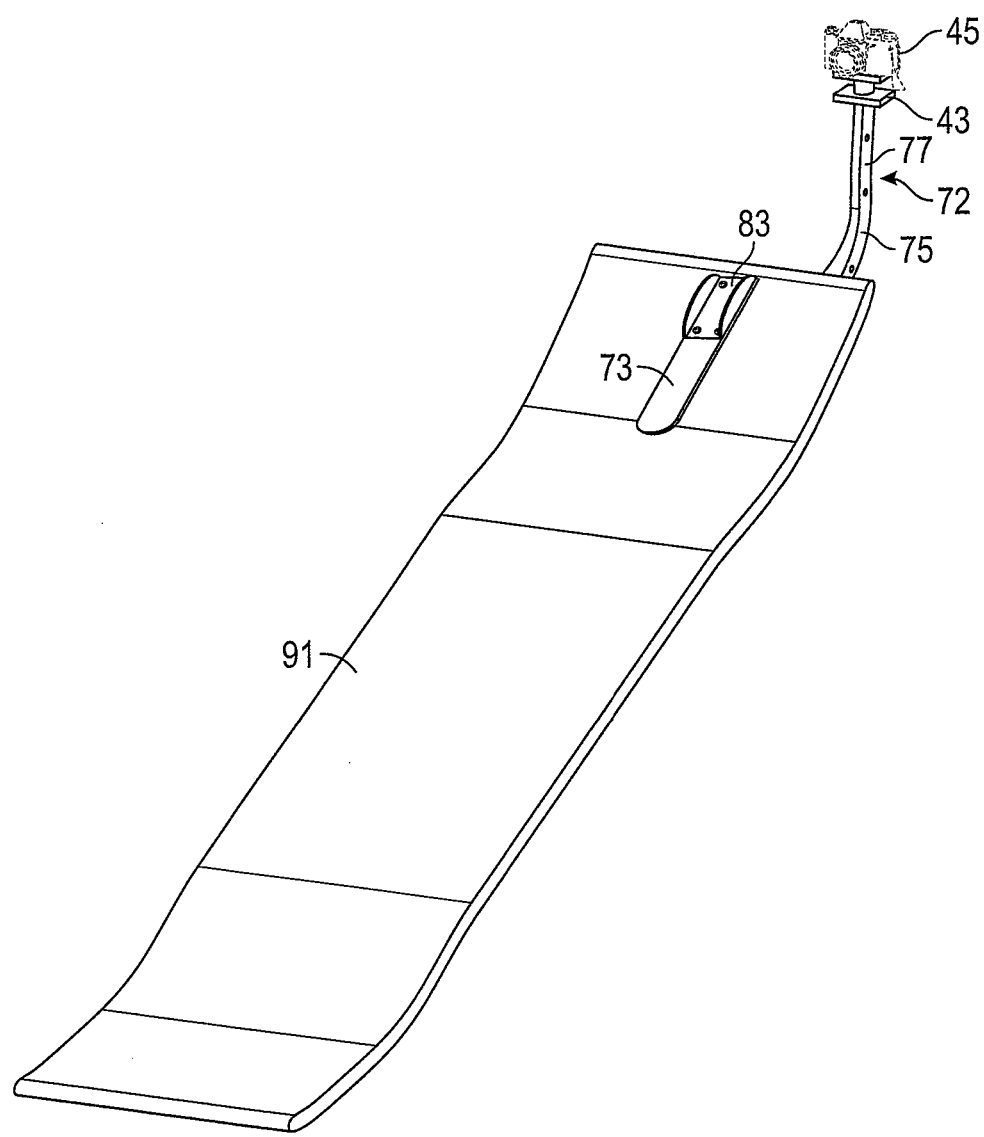
FIG. 10 is a perspective view of an extension member of the invention attached to a snow board.

FIG. 10 illustrates a snow board 91 with an extension member of the type shown in FIG. 8. Extension member 72 has a first rate section 73 mounted to the top of the board using a first plate 83. The central curved section 75 is mounted to the underside of the board directly below the first plate 83. The second straight section 77 is adjacent to the upwardly curved section 75 and terminates in the forward platform 43 supporting action camera 45.

In all instances, the extension member has a sufficiently forward mounting for the action camera 45 so that not only the feet and legs of a user may be recorded, but the entire body of the user and the entire board can be in the picture. The height of extension member should be minimal, perhaps an inch or two, to avoid sideways torque from wind or terrain. In water, extension members should be thin to minimize friction, similar to a fin. Once again, height should be minimized to avoid unwanted torque. The amount of forward extension of the end of the board may vary from several inches to up to approximately 36 inches. Elevation of the camera above the board is in the range of a few inches to about 24 inches. The extension member of the invention should be preferably a lightweight material so that properties of the support board are not substantially affected.

While the extension member has been described as connected to the nose region of a sport board, the same extension member can be used, with slight modifications to place the action camera at a desired height connected to the tail region of a sport board. Either end region of a sport board can be used with the extension member.

What is claimed is:

1. A sport board with a support for an action camera comprising:
    an elongated sport board having spaced apart parallel upper and lower surfaces with the upper surface having a width and length accommodating a person's feet, with a central lengthwise axis having a forward end with a nose region immediately behind the forward end and a rearward end opposite to the forward end;
    an extension member having opposed first and second ends, the first end connected to and end region of the sport board, the extension member having a first generally straight section aligned with the board linear axis, a curved upwardly concave section and a second generally straight section angled upwardly, the first and second generally straight sections on opposite ends of the curved section, and with the second generally straight section terminating at a location away from the sport board in a forward platform capable of supporting an action camera;

whereby an action camera mounted on the platform has a field of view of the person on the sport board.

2. The apparatus of claim 1 wherein the sport board is a surfboard.

3. The apparatus of claim 2 wherein the extension member is a fin.

4. The apparatus of claim 1 wherein the end region of the sport board is the nose region.

5. The apparatus of claim 1 wherein the end region of the sport board is the tail region.

6. The apparatus of claim 1 wherein the sport board is a skate board.

7. The apparatus of claim 1 wherein the sport board is a boogie board.

8. The apparatus of claim 1 wherein the extension member is attached to the sport board by fasteners in the bottom side of the board.

9. The apparatus of claim 1 wherein the extension member is attached to the sport board by fasteners in the top side of the board.

10. The apparatus of claim 5 wherein the two-piece member has a first piece mounted on the upper surface of the board and a second piece mounted on the lower surface of the board.

11. The apparatus of claim 1 wherein the extension member is perforated.

12. The apparatus of claim 1 wherein the extension member is a unitary member.

13. The apparatus of claim 1 wherein the extension member is a two-piece member.

* * * * *